(12) United States Patent
Chen et al.

(10) Patent No.: US 11,263,489 B2
(45) Date of Patent: Mar. 1, 2022

(54) TECHNIQUES FOR DENSE VIDEO DESCRIPTIONS

(71) Applicant: INTEL CORPORATION, Santa Clara, CA (US)

(72) Inventors: Yurong Chen, Beijing (CN); Jianguo Li, Beijing (CN); Zhou Su, Beijing (CN); Zhiqiang Shen, Beijing (CN)

(73) Assignee: INTEL CORPORATION, Santa Clara, CA (US)

( * ) Notice: Subject to any disclaimer, the term of this patent is extended or adjusted under 35 U.S.C. 154(b) by 121 days.

(21) Appl. No.: 16/616,533

(22) PCT Filed: Jun. 29, 2017

(86) PCT No.: PCT/CN2017/090686
§ 371 (c)(1),
(2) Date: Nov. 25, 2019

(87) PCT Pub. No.: WO2019/000293
PCT Pub. Date: Jan. 3, 2019

(65) Prior Publication Data
US 2021/0142115 A1 May 13, 2021

(51) Int. Cl.
*G06K 9/00* (2006.01)
*G06K 9/62* (2022.01)
(Continued)

(52) U.S. Cl.
CPC ......... *G06K 9/6259* (2013.01); *G06F 40/169* (2020.01); *G06K 9/00718* (2013.01); *G06K 9/00744* (2013.01); *G06N 3/08* (2013.01)

(58) Field of Classification Search
CPC ............ G06K 9/6259; G06K 9/00718; G06K 9/00744; G06F 40/169; G06N 3/08
See application file for complete search history.

(56) References Cited

U.S. PATENT DOCUMENTS 7,263,671 B2 * 8/2007 Hull ................... G06F 40/169
715/839
8,316,302 B2 * 11/2012 McKoen ............ G06F 16/7844
715/728
(Continued)

FOREIGN PATENT DOCUMENTS

CN 103299324 A 9/2013
CN 106028134 A1 9/2013

OTHER PUBLICATIONS

Shen et al., "Weakly Supervised Dense Video Captioning", Cornell University Library, Computer Science, Computer Vision and Pattern Recognition, arXiv: 1704.01502v1, (Apr. 5, 2017) 12 pages.
(Continued)

*Primary Examiner* — Amir Alavi
(74) *Attorney, Agent, or Firm* — Kacvinsky Daisak Bluni PLLC

(57) ABSTRACT

Techniques and apparatus for generating dense natural language descriptions for video content are described. In one embodiment, for example, an apparatus may include at least one memory and logic, at least a portion of the logic comprised in hardware coupled to the at least one memory, the logic to receive a source video comprising a plurality of frames, determine a plurality of regions for each of the plurality of frames, generate at least one region-sequence connecting the determined plurality of regions, apply a language model to the at least one region-sequence to generate description information comprising a description of at least a portion of content of the source video. Other embodiments are described and claimed.

24 Claims, 8 Drawing Sheets

(51) Int. Cl.
  *G06F 40/169* (2020.01)
  *G06N 3/08* (2006.01)

(56) References Cited

U.S. PATENT DOCUMENTS

| | | | |
|---|---|---|---|
| 10,204,274 B2* | 2/2019 | Smith, IV | H04N 21/23439 |
| 10,347,293 B1* | 7/2019 | Skinner | G06F 40/30 |
| 10,445,568 B2* | 10/2019 | Yang | G06N 3/08 |
| 10,528,866 B1* | 1/2020 | Dai | G06N 3/0445 |
| 10,949,880 B2* | 3/2021 | Singh | H04N 21/233 |
| 2005/0204291 A1* | 9/2005 | Negishi | H04N 7/17318 |
| | | | 715/734 |
| 2016/0154882 A1* | 6/2016 | Cheng | G06F 16/78 |
| | | | 707/758 |
| 2017/0024899 A1* | 1/2017 | Hammoud | G06T 7/254 |
| 2017/0083623 A1 | 3/2017 | Habibian et al. | |
| 2017/0124400 A1 | 5/2017 | Yehezkel et al. | |
| 2019/0246138 A1* | 8/2019 | Terterov | H04N 19/86 |
| 2021/0142115 A1* | 5/2021 | Chen | G06K 9/6259 |

OTHER PUBLICATIONS

International Search Report and Written Opinion for International Application No. PCT/CN2017/090686, dated Jan. 26, 2018, 6 pages.

Johnson et al., "DenseCap: Fully Convolutional Localization networks for Dense Captioning", 2016 IEEE Conference on Computer Vision and Pattern Recognition (CVRR), IEEE, Jun. 27, 2016, pp. 4565-4574.

European Search Report and Written Opinion for the European Patent Application No. EP17916116, dated Nov. 23, 2020, 4 pages.

\* cited by examiner

TECHNIQUES FOR DENSE VIDEO DESCRIPTIONS

CROSS-REFERENCE TO RELATED APPLICATION

This application is a national stage application claiming the benefit of and priority to International Application No. PCT/CN2017/090686 entitled "TECHNIQUES FOR DENSE VIDEO DESCRIPTIONS" filed Jun. 29, 2017, which is hereby incorporated by reference in its entirety.

TECHNICAL FIELD

Embodiments herein generally relate to information processing, and more particularly, to generating descriptions textually expressing the content of an image or series of images.

BACKGROUND

Improved networking and storage capabilities have facilitated the exponential increase in demand for video content for computing devices, particularly mobile devices. Service providers ranging from social networks, news platforms, and entertainment services are providing an ever-increasing amount of video content to users. However, the increase in available video content has made determining useful or relevant content more difficult because the vast majority of video content lacks substantive, useful descriptions. Conventional technology only provides for simple, superficial automated descriptions of video content that do not provide adequate information for searching or evaluating the relevancy of the content.

Conventional systems for describing images or videos typically describe an image using one sentence captions. For example, for video clips, systems typically focus on generating one caption for a short video clip using methods based on average pooling of features over frames, a soft-attention scheme, sequence-to-sequence learning, and/or the like. However, a single sentence cannot adequately and meaningfully describe the rich content of a video, particularly a video. It is expensive to provide region-sequence level sentence annotations for dense video captioning using conventional technology. The lack of such annotations has largely limited the needed progress for dense video captioning. In addition, the one-to-many mapping of sentence descriptions into one global visual representation is not sufficiently accurate.

DETAILED DESCRIPTION

Various embodiments may be generally directed to techniques for generating description information configured to textually describing the content of a video via a computing system. In some embodiments, the video may include a single image, a series of images, an image portion of a document, video, multimedia, and/or the like. The term image may include a series of images or a video; accordingly, the terms image and video may be used interchangeably herein. In various embodiments, the description information may include information indicating the visual content present in the video. In some embodiments, the computing system may include a dense video captioning application configured to receive or otherwise access the video and to generate description information (for instance, the text describing the video) and/or a captioned video (for instance, a video annotated with the description information). In general, description information arranged on or otherwise embedded in a video may be referred to as a caption. In some embodiments, the dense video captioning application may be operative to provide "dense" description information and/or captioned videos in which description information is generated for a plurality of regions of the video, for example, with one or more descriptors (for instance, sentences) for each region.

In some embodiments, the dense video captioning application may operate to determine region or segment-sequences from source videos (for instance, video clips), and generate a plurality of descriptors (for instance, multiple-sentence descriptions) for each region-sequence of the video. In some embodiments, the dense video captioning application may include various components or modules, including, without limitation, a visual component, a region-sequence component, and a language component. In various embodiments, the visual component may include a trained computational model operative to provide mapping between lexical words and video regions. In some embodiments, the region-sequence component may be operative to automatically generate informative and diverse region-sequences from the video based on, for example, the output of the visual module. In various embodiments, the language component may be operative to generate descriptor output for each region-sequence, for example, using a sequence-to-sequence learning framework computational model. Accordingly, in some embodiments, techniques are provided that are capable of generating autonomous natural language descriptions of video content in a manner that facilitates efficient and robust evaluation and/or search of video content.

Figure 1:
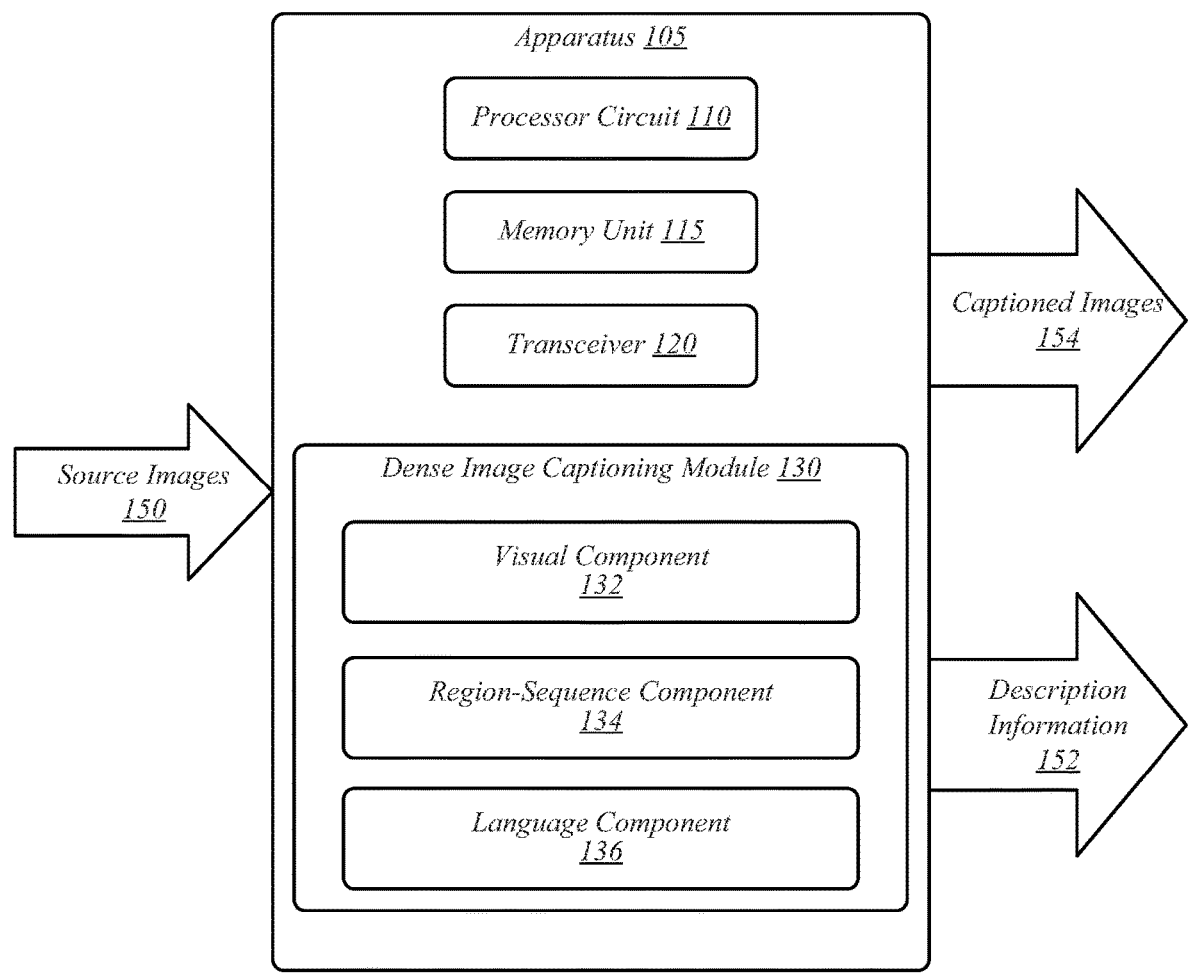
FIG. 1 illustrates an embodiment of a first operating environment.

FIG. 1 illustrates an example of an operating environment 100 that may be representative of various embodiments. The operating environment 100 depicted in FIG. 1 may include an apparatus 105 having a processor circuit 110, a memory unit 115, and a transceiver 120. Apparatus 105 may be embodied as any type of computation or computer device capable of performing the functions described herein, including, without limitation, a computer, a multiprocessor system, a server, a rack-mounted server, a blade server, a laptop computer, a notebook computer, a network appliance, a web appliance, a distributed computing system, a processor-based system, a consumer electronic device, combinations thereof, and/or the like.

Processor circuit 110 may include and or may access logic having instructions for performing operations according to some embodiments. Processor circuit 110 may be communicatively coupled to memory unit 115 and/or transceiver 120. In some embodiments, processor circuit 110 may include a system-on-a-chip (SoC), a central processing unit, and/or the like. In some embodiments, apparatus 105 may include a plurality of processor circuits 110, for example, each having one or more cores. Processor circuit 110 may be embodied as any type of processor capable of performing functions according to some embodiments. In some embodiments, processing circuit 110 may include a multi-core processor, however, in various other embodiments, processing circuit 110 may be embodied as a single or multi-core processor(s), digital signal processor, microcontroller, or other processor or processing/controlling circuit.

As shown in FIG. 1, apparatus 105 may include a dense video captioning module 130 for generating multiple diverse captions for source videos, for example, via weakly supervised learning from video level sentence annotations. In various embodiments, dense video captioning module 130 may include or may be disposed within a processor circuit, such as processor circuit 110, a SoC, a field-programmable gate array (FPGA), and/or the like. In some embodiments, dense video captioning module 130 may include a processor circuit. In some embodiments, dense video captioning module 130 may be implemented in software, firmware, hardware, or a combination thereof. In various embodiments, dense video captioning module 130 may be implemented in hardware configured to execute software, firmware, and/or the like to perform operations according to some embodiments. In some embodiments, dense video captioning module 130 may be or may include a software application operative to, among other things, process source videos 150 and generate description information 152 and/or captioned video 154 according to some embodiments. In some embodiments, dense video captioning module 130 may be or may include a software application executed by processor circuit 110 and/or other hardware of apparatus 105.

Dense video captioning module 130 may be configured to receive or otherwise access source videos 150. In general, source videos 150 may include any type of image or video file capable of being processed according to some embodiments, including graphics files (JPEG, TIFF, BMP, PNG, GIF, CGM, SVG, and/or the like), video files (AVI, FLV, WMV, MOV, MP4, MPEG, and/or the like), multimedia files, image and/or video portions of digital files (for instance, portions of hypertext markup language (HTML) files, word processing files, email files, and/or the like), portions thereof, combinations thereof, and/or the like. Source videos 150 may be processed by dense video captioning module 130 according to some embodiments to generate description information 152 and/or captioned video 154. In some embodiments, description information 152 may include text, files, records, and/or the like that describes the visual content of source videos 150. In some embodiments, description information 152 may include natural language descriptions, captions, sentences, text, and/or the like describing objects or other regions of interest in source videos 150. In various embodiments, captioned video 154 may include source images and/or videos annotated or otherwise associated with description information 152 and/or text derived from description information (for instance, "captions") (see, for example, FIG. 5).

Dense video captioning module 130 may include various components, including, without limitation, a visual component 132, a region-sequence component 134, and/or a language component 136. In various embodiments, visual component 132 may include a computational model operative to provide mapping between lexical words and image regions. In some embodiments, visual component 132 may include a trained or untrained computational model, such as a neural network. Non-limiting examples of computational models may include, without limitation, a machine-learning (ML) model, an artificial intelligence (AI) model, a neural network (NN), an artificial neural network (ANN), a convolutional neural networks (CNN), a deep learning (DL) network, and/or the like. In some embodiments, visual component 132 may include a lexically-fully convolutional neural network (lexical-FCN) trained or partially trained with weakly supervised multi-instance multi-label learning (MIMLL), for example, which may build a mapping between sentence lexical words and video regions (for instance, video grid (4×4) regions).

In various embodiments, region-sequence component 134 may be operative to automatically generate informative and diverse region-sequences from the video based on, for example, the output of visual module 132. In some embodiments, region-sequence component 134 may be configured to, among other things, solve a region-sequence generation problem. In various embodiments, region-sequence component 134 may include or use a modular maximization scheme to automatically generate informative and diverse region-sequences based on Lexical-FCN outputs of visual component 132. In some embodiments, the modular maximization scheme may be, include, partially include, or be similar to techniques described in Leskovec et al., "Cost-effective Outbreak Detection in Networks," Proceedings of the $13^{th}$ ACM SIGKDD International Conference on Knowledge Discovery and Data Mining (2007). In various embodiments, a winner-take-all (WTA) scheme may be used to associate description information 152 (for instance, descriptors or sentences) to region-sequences in a training phase.

In various embodiments, the language component 136 may be operative to generate descriptor or sentence output for each region-sequence, for example, using a sequence-to-sequence learning framework computational model. In some embodiments, the sequence-to-sequence learning framework computational model may be, include, or be similar to techniques described in Venugopalan et al., "Sequence-to-Sequence—Video to Text," The IEEE International Conference on Computer Vision (ICCV) (2015). In some embodiments, language component 136 may be implemented to include an encoder-decoder structure to encode visual features and to decode visual representations into a sequence of text, such as output words.

Figure 2:
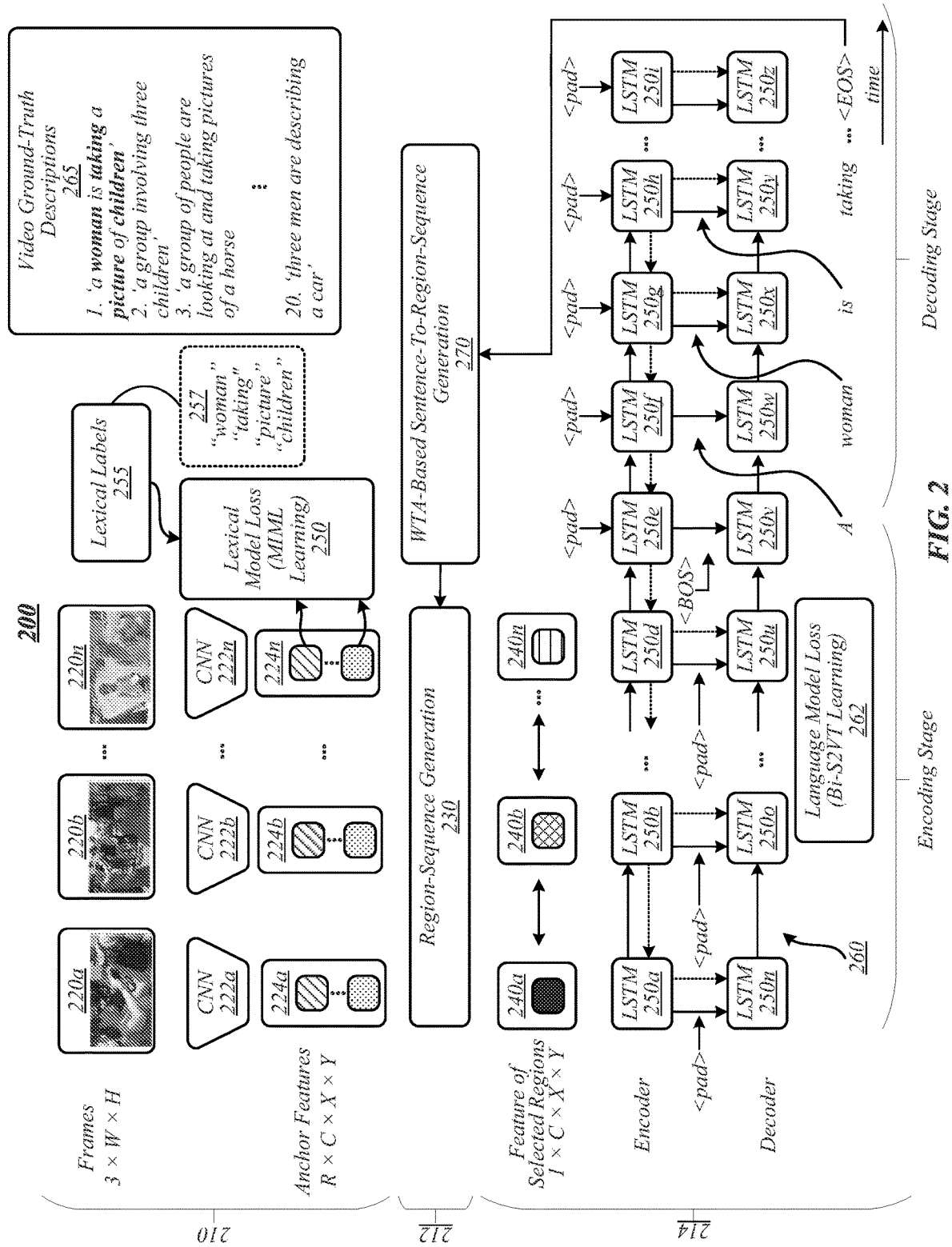
FIG. 2 illustrates an embodiment of a second operating environment.

FIG. 2 illustrates an example of an operating environment 200 that may be representative of various embodiments. The operating environment 200 depicted in FIG. 2 may generally depict components and operations of visual component 132 (section 210), region-sequence component 134 (section 212), and/or language component 136 (section 214) for implementing a dense video captioning process according to some embodiments.

Figure 3:
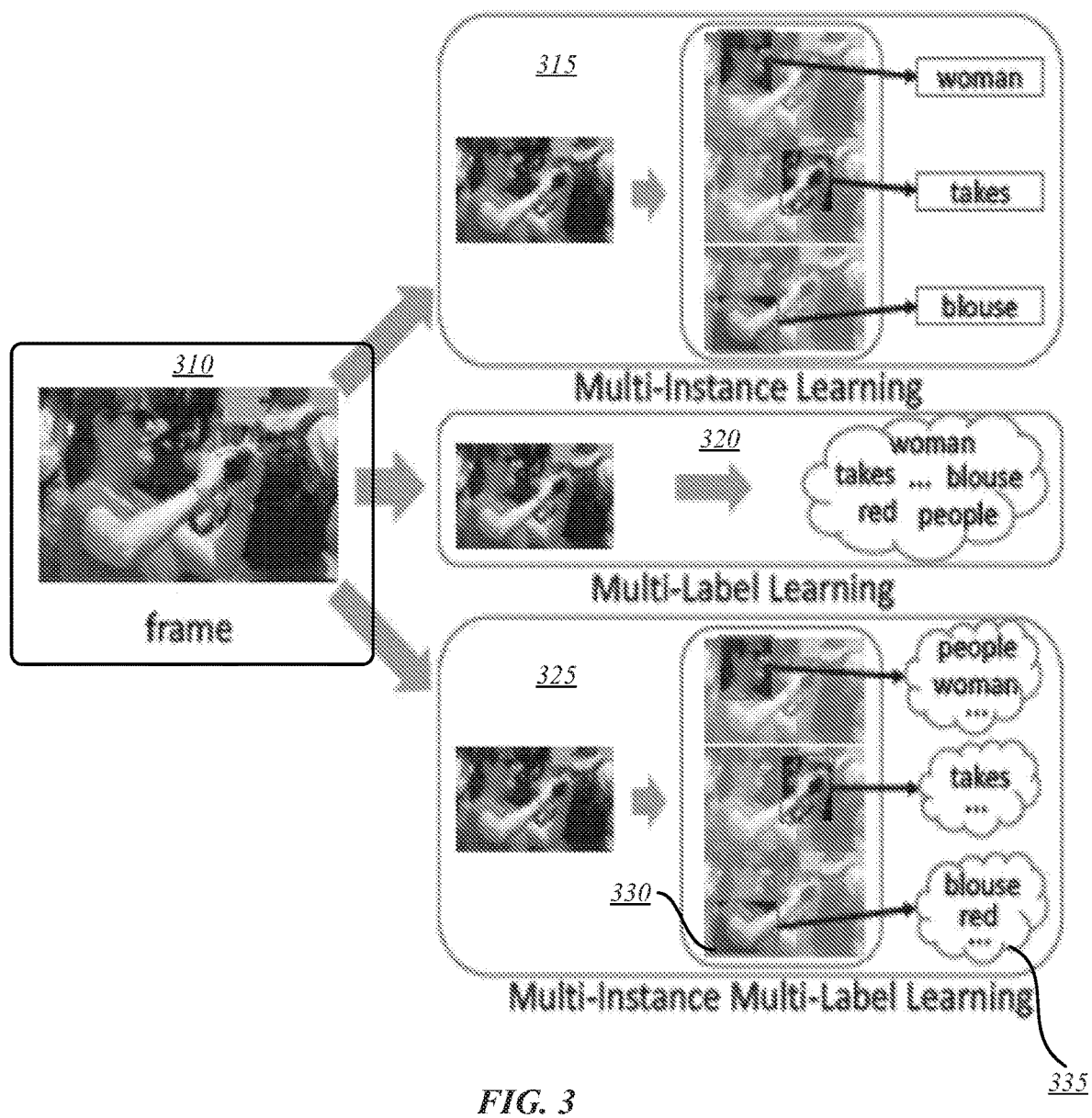
FIG. 3 illustrates multi-label and multi-instance learning techniques according to some embodiments.

In various embodiments, operating environment 200 may operate to provide multiple diverse and informative description information and/or captioned videos by weakly supervised learning from video-level sentence annotations. In some embodiments, MIMLL 250 may be used to learn or train a model used according to various embodiments. FIG. 3 depicts various learning techniques, for example, to demonstrate the different processes relating to multi-instance and/or multi-label based methods. As shown in FIG. 3, a video frame 310 may be processed using various techniques, including a multi-instance learning technique 315, a multi-label learning technique 320, and/or a MIMLL technique 325.

For example, MIMLL 325 may take $\{X_i, y_i\}$ as input pairs in which $X_i$ is a bag of instance regions (for instance, regions 330) $X_i = \{x_{i1}, \ldots, x_{ij}\}$, labelled with a set of words (for instance, words 335) $y_i = \{y_i^1, \ldots, y_i^w, \ldots, y_i^k\}$. In some embodiments, $x_{ij}$ may be a feature vector for each region (instance. In MIMLL, each instance may have one or multiple word labels. For instance, the terms "truck," "car," and "vehicle" or other synonyms may be used to describe an automobile. The following cross-entropy loss function may be used to measure multi-label error:

$$L(X, y; \theta) = 1 \frac{1}{N} \sum_{i=1}^{N} [y_i \cdot \log \hat{p}_i + (1 - y_i) \cdot \log(1 - \hat{p}_i)],$$

where θ are the model parameters, N is the total number of "bags," $\hat{p}_i$ is the probability vector to measure the probability that the bag belongs to each word. In some embodiments, the bag may be weakly labeled as negative, for example, when all instances in the bag are negative and, therefore a noisy-OR formulation may be used to combine the probabilities that the individual instances in the bag are negative, according to the following:

$$\hat{p}_i^w = P(y_i^w = 1 | X_i; \theta) = 1 - \Pi_{x_{ij} \in X_i}(1 - P(y = 1 | x_{ij}; \theta)),$$

where $\hat{p}_i^w$ is the probability when word w in the $i^{th}$ is positive, which may be defined as a Sigmoid function.

Referring back to FIG. 2, operations of visual component 132 (section 210) may include or use Lexical-FCN models 250 that build the mapping between regions of frames 220a-n and lexical labels 255. In some embodiments, Lexical-FCN 250 may build a lexical vocabulary 257 from a video caption training set. The part-of-speech may be extracted from each word in the entire training set. The words may belong to various parts-of-speech, including nouns, verbs, adjectives, pronouns, and/or the like. In various embodiments, certain parts-of-speech may include frequent functional words (for instance, "is," "are," "at," "on," "in," "with," "and," "to," and/or the like) that may be treated as stop words which are removed from the lexical vocabulary 257. Remaining words appearing over a threshold amount (for instance, 2 times, 3 times, 4 times, 5 times, 10 times, or any value or range between any two of these values (including endpoints)) may be maintained in the training set. For instance, the training set may include or may be based on the MSR-VTT training set to obtain a vocabulary with about 5,000 to 7,000 words (for instance, 6,690 words). The MSR-VTT training set may be, include, partially include, or be similar to the training set described in Xu et al., "MSR-VTT: A Large Video Description Dataset for Bridging Video and Language," The 2016 IEEE Conference on Computer Vision and Pattern Recognition (2016).

Lexical-FCN 250 may train the CNN models 222a-n with MIMLL loss according to various embodiments. In some embodiments, instead of starting training from the beginning (for instance, "from scratch"), training may be started from a model or model data set. For example, training may use training models such as the ImageNet visual data model for visual object recognition with VGG (for instance, VGG-16), ResNet (for instance, ResNet-50), and/or the like. In some embodiments, the training models may be tuned, for example, with MIMLL loss 250 on the MS-VTT training set.

In order to obtain dense captions, description information, such as descriptors or sentences, may be grounded to sequences of regions-of-interest (ROI) (for example, a region encircling or enveloping one or more objects or other distinctive areas within a frame). For instance, course region candidates may be generated from anchor points of response maps 224a-n generated in the lexical-FCN process. Before selection procedure, each video frame may produce convolutional-feature-map with C channels (for instance, similar to RGB image having 3 channels), in which X and Y are the width and height of the region in convolutional feature map, C is the channel number of convolutional-feature map, and R is the number of regions (for instance, 4×4=16 regular grid regions). After selection procedure, for each video-frame, 1 region may be selected with size C*X*Y.

In both training and interference phases, video frames 220a-n may be sampled and resized, for example, in both dimensions to 320 pixels. After proceeding through lexical-FCN, a 4×4 response map may be generated (for instance, having 4096 channels for VGG-16 and 2048 channels for ResNet-50). In some embodiments, each anchor point of response map 224a-n may represent a region in the original frame 220a-n. Accordingly, informative region-sequence generation via the visual component 132 (section 210) may be initiated starting with a number very-coarse grain regions (for instance, 2, 4, 6, 8, 10, 12, 14, 16, 18, 20, 25, 30, 35, 50, and any value or range between any two of these values (including endpoints).

Region-sequence component 134 (section 212) may operate a region-sequence generation process 230 configured to generate region-sequences by matching and sequentially connecting regions between different frames 220a-n. In general, regions between different frames may be matched and connected sequentially to produce the region-sequences. As each frame 220a-n may include a number of coarse regions (for instance, 16), even if each video clip is down-sampled (for instance, to 30 frames) the search space has a size of <number of coarse regions>$^{<number\ of\ frames>}$ (or $16^{30}$) for region-sequence generation. This would be a prohibitive amount for conventional methods, even for a training case that has video-level annotations. Accordingly, in some embodiments, a greedy sub-selection process may be used to manage large search spaces, for example, based on lexical-FCN output.

Figure 4:
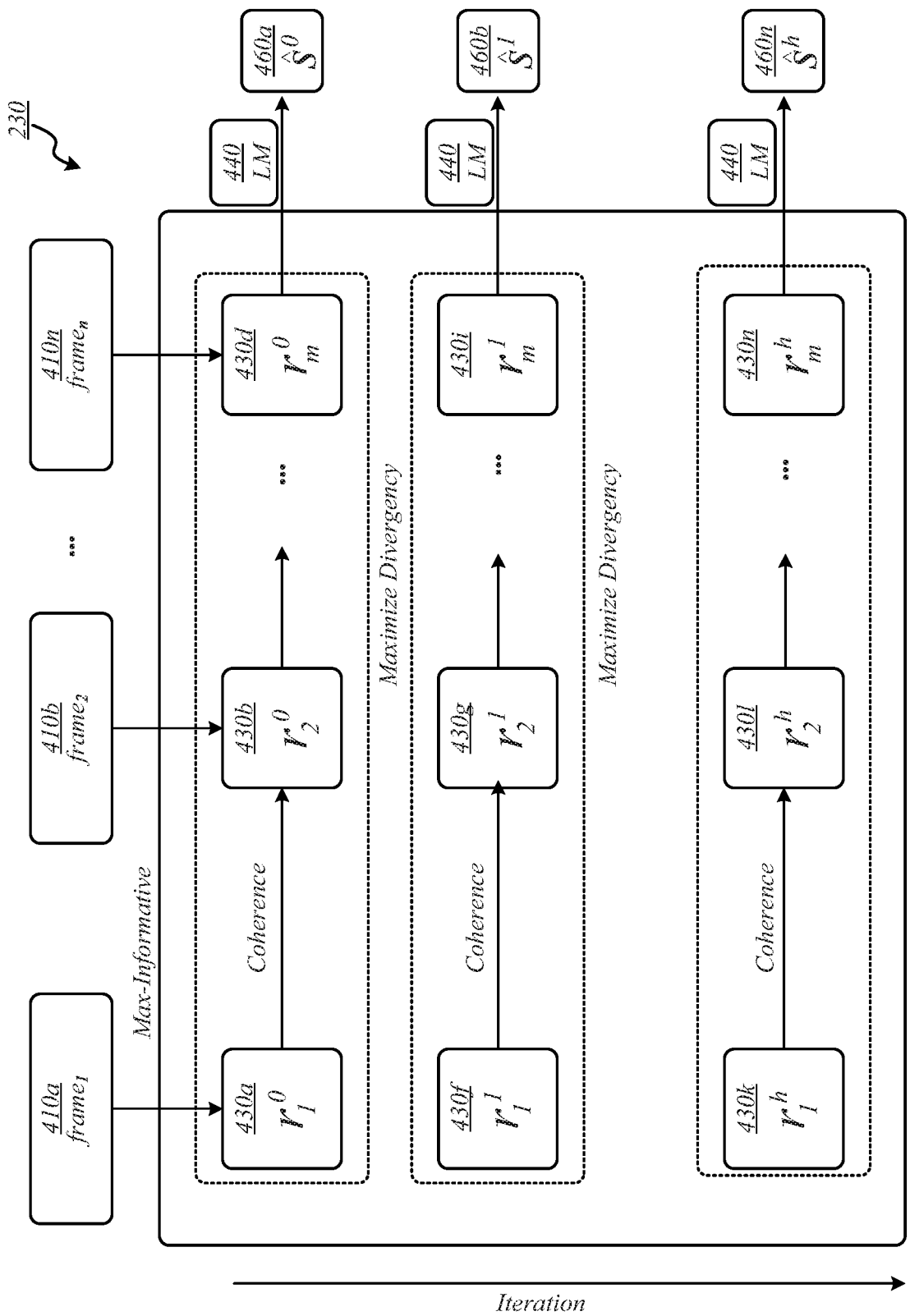
FIG. 4 illustrates a region-sequence generation process according to some embodiments.

FIG. 4 depicts a region-sequence generation process 230 according to some embodiments. As shown in FIG. 4, the region-sequence generation process 230 may be formulated as a sub-set selection problem in which the process starts from an empty set, and sequentially adds informative and coherent regions to each frame into the subset, while maintaining diversity among the different region-sequences.

In the region-sequence generation process 230 depicted in FIG. 4, frames 410a-n may be input into the process, where $r_i^j$ is the $j^{th}$ region 430a-n in the $i^{th}$ frame 410a-n, and LM 440 is the language model, and Ŝ is the resulting sentence output 460a-n. Regions 430a-n form region-sequences 420a-n, for example, regions 430a-d form region-sequence 420a, regions 430f-i form region-sequence 430b, regions 430k-n form region-sequence 420n, and so on.

In some embodiments, one or more functions may be used within region-sequence generation process 230 to provide various aspects of the process, such as informativeness, coherence, and diversity. For example, informativeness of a region 430a-n may be defined as the following informative function:

$$f_{inf}(X_v, A_t) = \Sigma_w \hat{p}^w; \hat{p}^w = \max_{i \in A_t} \hat{p}_i^w,$$

where $x_v$ are the feature vectors of a current video (that is the source of frames 410a-n), $A_t$ is the current region-sequence subset until frame t. In general, informativeness may provide that in each step, the region that can maximize information (for instance, in terms of word probability score) should be added.

In general, coherence may operate to ensure the temporal coherence of a region 430a-n, since significant changes of region contents may negatively affect LM 440. In various embodiments, coherence may be defined using the following coherence function:

$$f_{coh} = \Sigma_{r_s \in A_{t-1}}(x_{r_t}, x_{r_s}),$$

where $x_{r_t}$ is the feature vector of frame-t 410*a-n*, $x_{r_s}$ is the feature vector of regions 430*a-n* in (t−1)-frame 410*a-n*. In general, the coherence function may operate to maximize a cosine similarity between two continuous and matched regions 430*a-n*.

In general, diversity may include a measure of the degree of difference between a candidate region 430*a-n* and all the existing regions 430*a-n*. In some embodiments, diversity may be defined using the following divergence or diversity function:

$$f_{div} = \sum_{i=1}^{N} \int_{w} p_i^w \log \frac{p_i^w}{q^w} dw,$$

where $q^w$ is the probability distribution of a candidate region 430*a-n*. In general, the diversity function may operate such that two regions 430*a-n* may be maximally separated in terms of divergence.

In some embodiments, regions 430*a-n* may be selected based on various selection criteria, such as informativeness, coherency, divergency, and/or the like and any combination thereof. In various embodiments, regions 430*a-n* may be selected to obtain the maximum informative and coherent region-sequences, which may be fed into LM 440 for sentence output 460*a-n*. As shown in FIG. 4, the region-sequence generation process 230, portions thereof, and/or one or more of the informative function, coherence function, and diversity function may be iteratively applied to frames 410*a-n* and/or regions-sequences 430*a-n*. For example, the most informative region-sequence(s) 430*a-n* may be selected and feed to LM 440 for sentence 460*a-n* output. Region-sequence(s) 430*a-n* that maximize diversity to generate multiple sentence outputs may be iteratively selected for subsequent processing.

Referring to FIG. 2, a WTA process 270 may be used to associate (for instance, weakly associate) sentences to region-sequences, for example, during a training phase. In some embodiments, WTA process 270 may include a WTA-based sentence-to-region-sequence generation process. In some embodiments, WTA process 270 may use ground truth sentences 265 associated with visual objects in frames 220*a-n*.

Language component 136 (section 214) may operate by weakly modeling associated temporal structure between regions sequences and sentences with a sequence-to-sequence learning framework 260. In some embodiments, sequence-to-sequence learning framework 260 may be, include, or be similar to S2VT as described in Venugopalan et al., "Sequence-to-Sequence—Video to Text," The IEEE International Conference on Computer Vision (ICCV) (2015). In some embodiments, sequence-to-sequence learning framework 260 may include a language model loss process 262, such as Bi-S2VT learning. In some embodiments, language component 136 may operate using an encoder/decoder structure. For example, sequence-to-sequence learning framework 260 may encode visual features of selected regions 240*a-n*, such as visual feature sequence $\vec{V} = (v_1, \ldots, v_t)$, with a recurrent neural network (RNN), such as long-short term memory (LSTM) networks 250*a-n*, to decode the visual representation into a sequence of output words $\vec{U} = (u_1, \ldots, u_t)$. In some embodiments, LSTMs 250*a-n* may be used to model a sequence in both an encoder part and a decoder part. In some embodiments, for example, in an embodiment in which S2VT is used as or as part of sequence-to-sequence learning framework 260, the S2VT bi-directional encoder may be extended so that S2VT learning may stack three LSTM 250*a-n* models. For example, a first LSTM 250*a-n* may forward visual feature sequence $\vec{V}$, and the second LSTM 250*a-n* may encode the reverse visual feature sequence $\overleftarrow{V}$. The first and second (or a first portion of) LSTMs 250*a-n* may form an encoder part. In some embodiments, a third (or a second portion of) LSTMs 250*a-n* may decode visual codes from both a forward pass and a backward pass into sequences of words (for instance, sentences).

Figure 5:
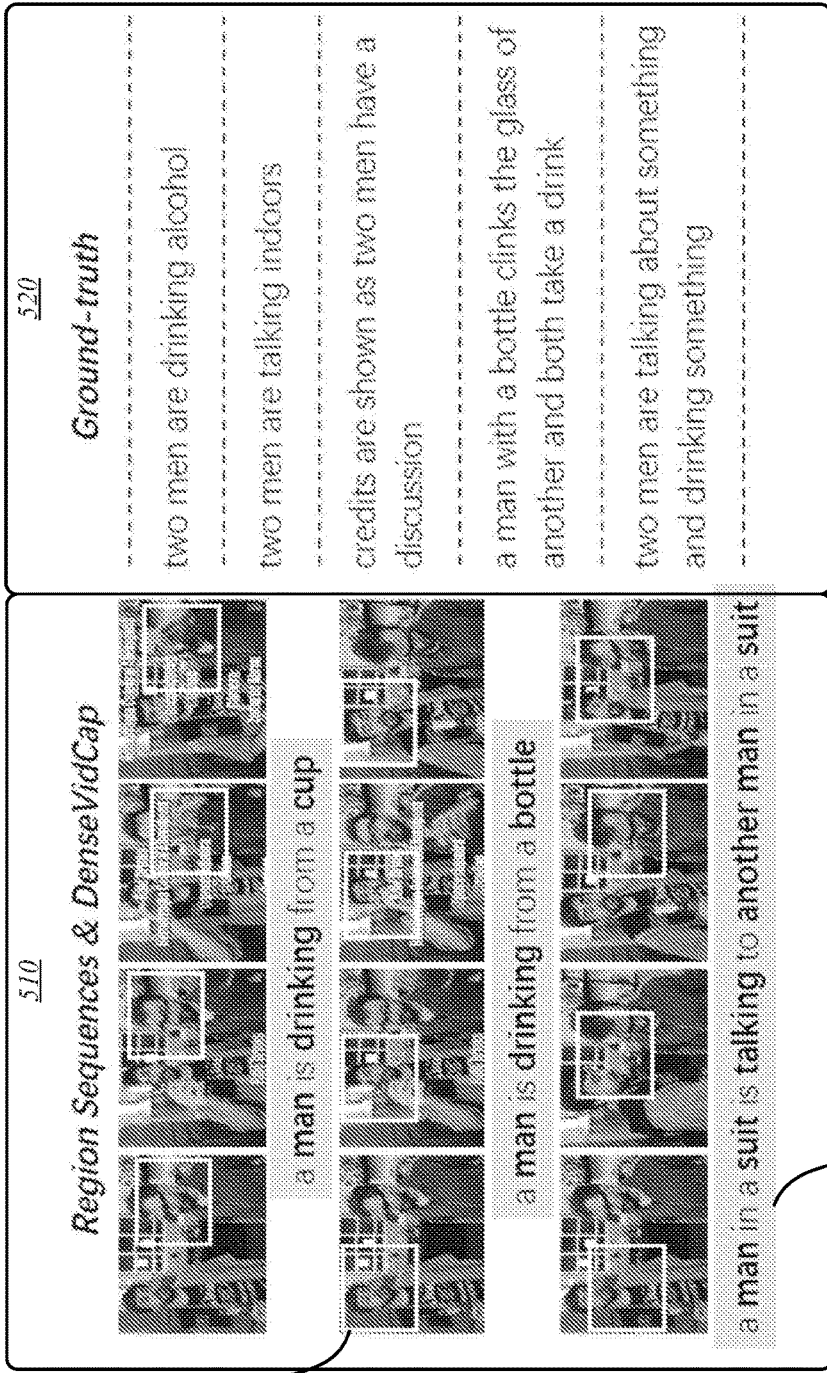
FIG. 5 illustrates a captioned video according to some embodiments.

FIG. 5 depicts a captioned video generated according to some embodiments. As shown in FIG. 5, a captioned video 510 may include annotated video content, including region-sequences 540 and captions 530 associated with the video content. Ground truth 520 (e.g., manual description of content) may be used as a comparison, demonstrating the accuracy of the dense video captioning process according to some embodiments. As depicted in FIG. 5, the dense video captioning process may operate to generate region-sequences 540 for a continuous sequence of video clip images and to subsequently generate a plurality of sentences 530 based on region-sequences 540, while accurately describing the visual objects within the region-sequences of the frames.

Included herein are one or more logic flows representative of exemplary methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, hardware, or any combination thereof. In software and firmware embodiments, a logic flow may be implemented by computer executable instructions stored on a non-transitory computer readable medium or machine readable medium, such as an optical, magnetic or semiconductor storage. The embodiments are not limited in this context.

Figure 6:
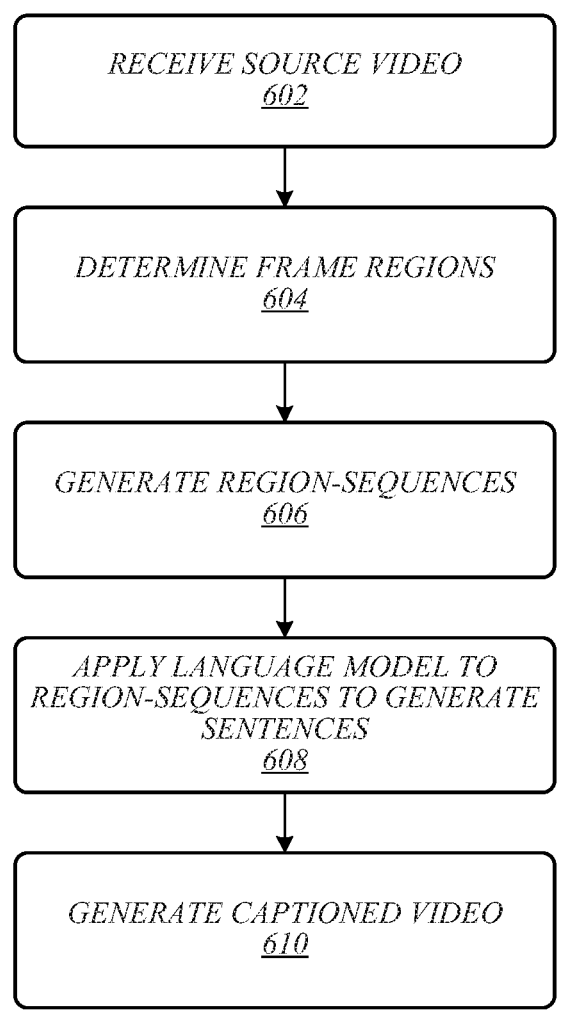
FIG. 6 illustrates an embodiment of a first logic flow.

FIG. 6 illustrates an embodiment of a logic flow 600 of apparatus 105 illustrated in FIG. 1 and/or components of dense video captioning module 130 illustrated in FIG. 2 according to some embodiments. Logic flow 600 may be representative of some or all of the operations executed by one or more embodiments described herein, such as apparatus 105. In some embodiments, logic flow 600 may be representative of some or all of the operations of a dense video captioning process to generate description information and/or captioned videos.

In the illustrated embodiment shown in FIG. 6, logic flow 600 at block 602 may receive source video. For example, apparatus 105 may receive source video 150 in the form of a video clip of a certain number of frames. In some embodiments, the source video may be formatted, modified, downsampled, or otherwise edited. For example, a source video may be downsampled to only include a certain number of frames, such as 30 frames. At block 604, frame regions may be determined by logic flow 600. For example, frames 220a-n may be processed using CNN 222a-n to generate response maps 224a-n having regions (for instance, regions 330 indicating objects in frame). In some embodiments, the regions may include coarse regions, such as 16 coarse regions and/or coarse region candidates.

At block 606, logic flow 600 may generate region-sequences. For example, region-sequence component 134 (section 212) may operate a region-sequence generation process 230 configured to generate region-sequences by matching and sequentially connecting regions between different frames 220a-n. In general, regions between different frames may be matched and connected sequentially to produce the region-sequences. In some embodiments, region-sequences 460 may be selected based on various selection criteria, such as informativeness, coherency, divergency, and/or the like and any combination thereof. In various embodiments, regions 430a-n may be selected to obtain the maximum informative and coherent region-sequences, which may be fed into LM 440 for sentence output 460. As shown in FIG. 4, the region-sequence generation process 230, portions thereof, and/or one or more of the informative function, coherence function, and diversity function may be iteratively applied to frames 410a-n and/or regions-sequences 430a-n. For example, the most informative region-sequence(s) 430a-n may be selected and feed to LM 440 for sentence 460 output. Region-sequence(s) 430a-n that maximize diversity to generate multiple sentence outputs may be iteratively selected for subsequent processing.

Logic flow 600 may apply a language model to region-sequences to generate sentences at block 608. For example, language component 136 (section 214) may operate by weakly modeling associated temporal structure between regions sequences and sentences with a sequence-to-sequence learning framework 260. In some embodiments, sequence-to-sequence learning framework 260 may include a S2VT-based framework. In some embodiments, language component 136 may operate using an encoder/decoder structure. For example, sequence-to-sequence learning framework 260 may encode visual features of selected regions 240a-n, such as visual feature sequence $\vec{V}=(v_1, \ldots, v_t)$, with a recurrent neural network (RNN), such as long-short term memory (LSTM) 250a-n, to decode the visual representation into a sequence of output words $\vec{U}=(u_1, \ldots, u_t)$. In some embodiments, LSTMs 250a-n may be used to model a sequence in both an encoder part and a decoder part. In some embodiments, for example, in an embodiment in which S2VT is used as or as part of sequence-to-sequence learning framework 260, the S2VT bi-directional encoder may be extended so that S2VT learning may stack three LSTM 250a-n models. For example, a first LSTM 250a-n may forward visual feature sequence $\vec{V}$, and the second LSTM 250a-n may encode the reverse visual feature sequence $\overleftarrow{v}$.

At block 610, logic flow may generate a captioned video. For example, a captioned video such as captioned video 510 may be generated to include annotated video content, including region-sequences 540 and captions 530 associated with the video content. Region-sequences 540 may include region-sequences generated via region-sequence component 134 (section 212) operating a region-sequence generation process 230 configured to generate region-sequences by matching and sequentially connecting regions between different frames 220a-n. Captions 530 may be formed from sentences, for example, sentences 460a-n formed by applying LM 440 to regions 430a-n.

EXAMPLES

Example 1—MSR-VTT Video-to-Language Experiment

A dense video captioning process according to some embodiments was used to process MSR-VTT in a video-to-language experiment in which, given an input video clip, the goal is to automatically generate a complete and natural sentence to describe video content, ideally encapsulating its most informative dynamics. As demonstrated by the results in Table 1, the video captioning process according to some embodiments achieved better results for the evaluated metrics against the listed top-four models that participated in a challenge involving MSR-VTT video-to-language processes (values indicate percent accuracy):

TABLE 1

| Model | Metrics | | | |
| --- | --- | --- | --- | --- |
| | METEOR | BLEU@4 | ROUGE-L | CIDEr |
| Dense video captioning process according to some embodiments | 28.3 | 41.4 | 61.1 | 48.9 |
| Model 1 | 26.9 | 38.7 | 58.7 | 45.9 |
| Model 2 | 27.7 | 39.1 | 60.6 | 44.1 |
| Model 3 | 26.9 | 39.8 | 59.8 | 45.7 |
| Model 4 | 28.2 | 40.8 | 60.9 | 44.8 |

Accordingly, the dense video captioning process according to some embodiments is able to process videos and provide natural language descriptions of visual content of the videos in a marked improvement over conventional and other state-of-the art systems.

Figure 7:
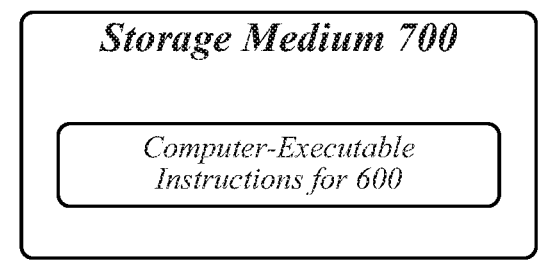
FIG. 7 illustrates an example of a storage medium.

FIG. 7 illustrates an example of a storage medium 700. Storage medium 700 may comprise an article of manufacture. In some examples, storage medium 700 may include any non-transitory computer readable medium or machine readable medium, such as an optical, magnetic or semiconductor storage. Storage medium 700 may store various types of computer executable instructions, such as instructions to implement logic flow 600. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 8:
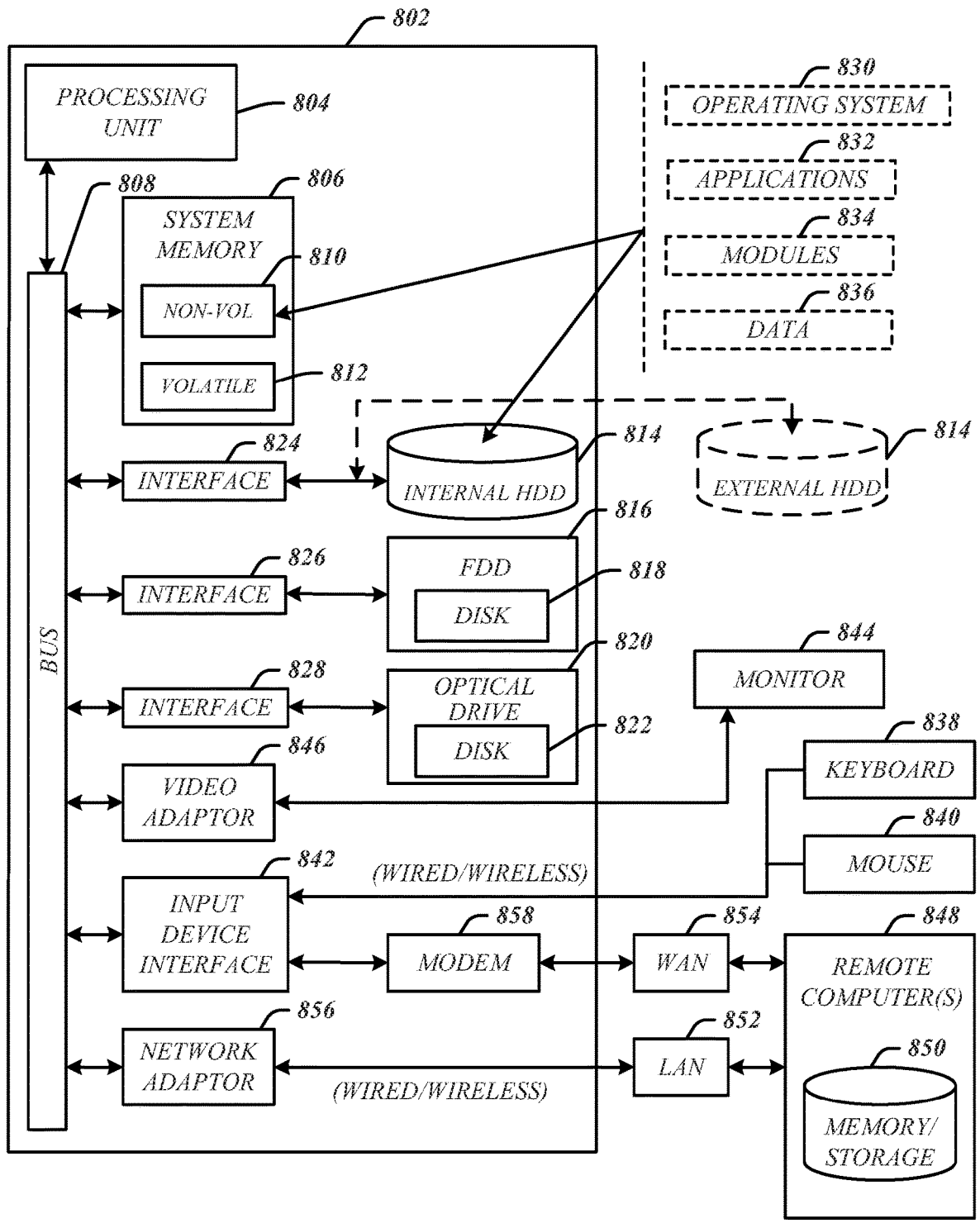
FIG. 8 illustrates an example computing platform.

FIG. 8 illustrates an example computing platform 800. In some examples, as shown in FIG. 8, computing platform 800 may include a processing component 840, other platform components or a communications interface 860. According to some examples, computing platform 800 may be implemented in a computing device such as a server in a system such as a data center. Embodiments are not limited in this context.

According to some examples, processing component 840 may execute processing operations or logic for apparatus 105. Processing component 840 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 850 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 860 may include logic and/or features to support a communication interface. For these examples, communications interface 860 may include one or more communication interfaces that operate according to various communication protocols or standards to communicate over direct or network communication links. Direct communications may occur via use of communication protocols or standards described in one or more industry standards (including progenies and variants) such as those associated with the PCI Express specification. Network communications may occur via use of communication protocols or standards such those described in one or more Ethernet standards promulgated by the Institute of Electrical and Electronics Engineers (IEEE). For example, one such Ethernet standard may include IEEE 802.3-2012, Carrier sense Multiple access with Collision Detection (CSMA/CD) Access Method and Physical Layer Specifications, Published in December 2012 (hereinafter "IEEE 802.3"). Network communication may also occur according to one or more OpenFlow specifications such as the OpenFlow Hardware Abstraction API Specification. Network communications may also occur according to Infiniband Architecture Specification, Volume 1, Release 1.3, published in March 2015 ("the Infiniband Architecture specification").

Computing platform 800 may be part of a computing device that may be, for example, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of computing platform 800 described herein, may be included or omitted in various embodiments of computing platform 800, as suitably desired.

The components and features of computing platform 800 may be implemented using any combination of discrete circuitry, ASICs, logic gates and/or single chip architectures. Further, the features of computing platform 800 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 800 shown in the block diagram of FIG. 8 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following include examples according to some embodiments:

Example 1 is an apparatus, comprising at least one memory, and logic, at least a portion of the logic comprised in hardware coupled to the at least one memory, the logic to receive a source video comprising a plurality of frames, determine a plurality of regions for the plurality of frames, generate at least one region-sequence connecting the determined plurality of regions, and apply a language model to the at least one region-sequence to generate description information comprising a description of at least a portion of content of the source video.

Example 2 is the apparatus of Example 1, the logic to generate a captioned video comprises at least one of the plurality of frames annotated with the description information.

Example 3 is the apparatus of Example 1, the logic to generate a captioned video comprises at least one of the plurality of frames annotated with the at least one region-sequence and the description information.

Example 4 is the apparatus of Example 1, each of the plurality of regions comprises a region of interest.

Example 5 is the apparatus of Example 1, the description information comprises a natural language description of at least one of the plurality of regions.

Example 6 is the apparatus of Example 1, the logic is further to determine the at least one region-sequence based on at least one selection criterion, the at least one selection criterion comprises an informativeness selection criterion.

Example 7 is the apparatus of Example 1, the logic is further to determine the at least one region-sequence based on at least one selection criterion, the at least one selection criterion comprises an informativeness selection criterion configured to maximize information in the at least one region-sequence.

Example 8 is the apparatus of Example 1, the logic is further to determine the at least one region-sequence based on at least one selection criterion, the at least one selection criterion comprises an informativeness selection criterion defined as $f_{inf}(x_v, A_t) = \Sigma_w p^w$, $p^w = \max_{i \in A_t} p_i^w$, where $x_v$ are feature vectors of the source video, $A_t$ is a current region-sequence subset until frame t.

Example 9 is the apparatus of Example 1, the logic is further to determine the at least one region-sequence based on at least one selection criterion, the at least one selection criterion comp comprises rising a coherency selection criterion.

Example 10 is the apparatus of Example 1, the logic is further to determine the at least one region-sequence based on at least one selection criterion, the at least one selection criterion comprises a coherency selection criterion configured to maximize a cosine similarity between the plurality of regions of the at least one-region sequence.

Example 11 is the apparatus of Example 1, the logic is further to determine the at least one region-sequence based on at least one selection criterion, the at least one selection criterion comprises a coherency selection criterion defined as $f_{coh} = \Sigma_{r_s \in A_{t-1}} (x_{r_t}, x_{r_s})$, where $x_{r_t}$ is a feature vector of a frame t, $x_{r_s}$ is a feature vector of the plurality of regions in a frame t−1.

Example 12 is the apparatus of Example 1 the logic is further to determine the at least one region-sequence based on at least one selection criterion, the at least one selection criterion comprises a divergency selection criterion.

Example 13 is the apparatus of Example 1 the logic is further to determine the at least one region-sequence based on at least one selection criterion, the at least one selection criterion comprises a divergency selection criterion configured to maximally separate the plurality of regions of the at least one region-sequence in terms of divergence.

Example 14 is the apparatus of Example 1 the logic is further to determine the at least one region-sequence based on at least one selection criterion, the at least one selection criterion comprises a divergency selection criterion defined as $$f_{div} = \sum_{i=1}^{N} \int_w p_i^w \log\frac{p_i^w}{q^w} dw,$$

where $q^w$ is a probability distribution of a candidate region of the plurality of regions.

Example 15 is the apparatus of Example 1, the logic is further to determine the at least one region-sequence based on at least one selection criterion, the at least one selection criterion comprises at least one of an informativeness selection criterion, a coherency selection criterion, or a divergency selection criterion.

Example 16 is the apparatus of Example 1, the logic is further to process the at least one frame via a computational model to generate a response map comprising at least one anchor point representing at least one region of the plurality of regions.

Example 17 is the apparatus of Example 1, the logic is further to process the at least one frame via a computational model, the computational model comprises a convolutional neural network (CNN).

Example 18 is the apparatus of Example 1, the logic is further to process the at least one frame via a computational model comprises a convolutional neural network (CNN), the CNN comprising a lexical-fully convolutional neural network (lexical-FCN).

Example 19 is the apparatus of Example 1, the logic is further to process the at least one frame via a computational model comprising a convolutional neural network (CNN) trained with a multi-instance multi-label learning (MIMLL) process.

Example 20 is the apparatus of Example 1, the logic is further to process the at least one frame via a computational model comprising a convolutional neural network (CNN) trained with a multi-instance multi-label learning (MIMLL) process to generate a lexical-fully convolutional neural network (lexical-FCN).

Example 21 is the apparatus of Example 1, the language model comprises a sequence-to-sequence learning framework comprising at least one recurrent neural network (RNN).

Example 22 is the apparatus of Example 1, the language model comprises a sequence-to-sequence learning framework comprising a plurality of long-short term memory networks (LSTMs).

Example 23 is a system, comprising the apparatus according to any of Examples 1-22, and at least one transceiver.

Example 24 is a method, comprising receiving a source video comprising a plurality of frames, determining a plurality of regions for each of the plurality of frames, generating at least one region-sequence connecting the determined plurality of regions, and applying a language model to the at least one region-sequence to generate description information comprising a description of at least a portion of content of the source video.

Example 25 is the method of Example 24, further comprising generating a captioned video comprising at least one of the plurality of frames annotated with the description information.

Example 26 is the method of Example 24, further comprising generating a captioned video comprising at least one of the plurality of frames annotated with the at least one region-sequence and the description information.

Example 27 is the method of Example 24, each of the plurality of regions comprises a region of interest.

Example 28 is the method of Example 24, the description information comprises a natural language description of at least one of the plurality of regions.

Example 29 is the method of Example 24, wherein determining the at least one region-sequence comprises determining the at least one region-sequence based on at least one selection criterion, the at least one selection criterion comprises an informativeness selection criterion.

Example 30 is the method of Example 24, wherein determining the at least one region-sequence comprises determining the at least one region-sequence based on at least one selection criterion, the at least one selection criterion comprises an informativeness selection criterion configured to maximize information in the at least one region-sequence.

Example 31 is the method of Example 24, wherein determining the at least one region-sequence comprises determining the at least one region-sequence based on at least one selection criterion, the at least one selection criterion comprises an informativeness selection criterion defined as $f_{inf}(x_v, A_t) = \Sigma_w p^w$, $p^w = \max_{i \in A_t} p_i^w$, where $x_v$ are feature vectors of the source video, $A_t$ is a current region-sequence subset until frame t.

Example 32 is the method of Example 24, wherein determining the at least one region-sequence comprises determining the at least one region-sequence based on at least one selection criterion, the at least one selection criterion comprises a coherency selection criterion.

Example 33 is the method of Example 24, wherein determining the at least one region-sequence comprises determining the at least one region-sequence based on at least one selection criterion, the at least one selection criterion comprises a coherency selection criterion configured to maximize a cosine similarity between the plurality of regions of the at least one-region sequence.

Example 34 is the method of Example 24, wherein determining the at least one region-sequence comprises determining the at least one region-sequence based on at least one selection criterion, the at least one selection criterion comprises a coherency selection criterion defined as $f_{coh} = \Sigma_{r_s \in A_{t-1}}(x_{r_t}, x_{r_s})$, where $x_{r_t}$ is a feature vector of a frame t, $x_{r_s}$ is a feature vector of the plurality of regions in a frame t-1.

Example 35 is the method of Example 24, wherein determining the at least one region-sequence comprises determining the at least one region-sequence based on at least one selection criterion, the at least one selection criterion comprises a divergency selection criterion.

Example 36 is the method of Example 24 wherein determining the at least one region-sequence comprises determining the at least one region-sequence based on at least one selection criterion, the at least one selection criterion comprises a divergency selection criterion configured to maximally separate the plurality of regions of the at least one region-sequence in terms of divergence.

Example 37 is the method of Example 24, wherein determining the at least one region-sequence comprises determining the at least one region-sequence based on at least one selection criterion, the at least one selection criterion comprises a divergency selection criterion defined as $$f_{div} = \sum_{i=1}^{N} \int_w p_i^w \log \frac{p_i^w}{q^w} dw,$$

where $q^w$ is a probability distribution of a candidate region of the plurality of regions.

Example 38 is the method of Example 24, wherein determining the at least one region-sequence comprises determining the at least one region-sequence based on at least one selection criterion, the at least one selection criterion comprises at least one of an informativeness selection criterion, a coherency selection criterion, or a divergency selection criterion.

Example 39 is the method of Example 24, further comprising processing the at least one frame via a computational model to generate a response map comprising at least one anchor point representing at least one of the plurality of regions.

Example 40 is the method of Example 24, further comprising processing the at least one frame via a computational model, the computational model comprises a convolutional neural network (CNN).

Example 41 is the method of Example 24, further comprising processing the at least one frame via a computational model comprising a convolutional neural network (CNN), the CNN comprising a lexical-fully convolutional neural network (lexical-FCN).

Example 42 is the method of Example 24, further comprising processing the at least one frame via a computational model comprising a convolutional neural network (CNN) trained with a multi-instance multi-label learning (MIMLL) process.

Example 43 is the method of Example 24, further comprising processing the at least one frame via a computational model comprising a convolutional neural network (CNN) trained with a multi-instance multi-label learning (MIMLL) process to generate a lexical-fully convolutional neural network (lexical-FCN).

Example 44 is the method of Example 24, the language model comprises a sequence-to-sequence learning framework comprising at least one recurrent neural network (RNN).

Example 45 is the method of Example 24, the language model comprises a sequence-to-sequence learning framework comprising a plurality of long-short term memory networks (LSTMs).

Example 46 is a non-transitory computer-readable storage medium that stores executable computer instructions for execution by processing circuitry of a computing device, the executable computer instructions to cause the computing device to receive a source video comprising a plurality of frames, determine a plurality of regions for each of the plurality of frames, generate at least one region-sequence connecting the determined plurality of regions, and apply a language model to the at least one region-sequence to generate description information comprising a description of at least a portion of content of the source video Example 47 is the non-transitory computer-readable storage medium of Example 46, the executable computer instructions to cause the computing device to generate a captioned video comprising at least one of the plurality of frames annotated with the description information.

Example 48 is the non-transitory computer-readable storage medium of Example 46, the executable computer instructions to cause the computing device to generate a captioned video comprising at least one of the plurality of frames annotated with the at least one region-sequence and the description information.

Example 49 is the non-transitory computer-readable storage medium of Example 46, each of the plurality of regions comprises a region of interest.

Example 50 is the non-transitory computer-readable storage medium of Example 46, the description information comprises a natural language description of at least one of the plurality of regions.

Example 51 is the non-transitory computer-readable storage medium of Example 46, the executable computer instructions to cause the computing device to determine the at least one region-sequence based on at least one selection criterion, the at least one selection criterion comprises an informativeness selection criterion.

Example 52 is the non-transitory computer-readable storage medium of Example 46, the executable computer instructions to cause the computing device to determine the at least one region-sequence based on at least one selection criterion, the at least one selection criterion comprises an informativeness selection criterion configured to maximize information in the at least one region-sequence.

Example 53 is the non-transitory computer-readable storage medium of Example 46, the executable computer instructions to cause the computing device to determine the at least one region-sequence based on at least one selection criterion, the at least one selection criterion comprises an informativeness selection criterion defined as $f_{inf}(x_v, A_t) = \Sigma_w p^w$, $p^w = \max_{i \in A_t} p_i^w$, where $x_v$ are feature vectors of the source video, $A_t$ is a current region-sequence subset until frame t.

Example 54 is the non-transitory computer-readable storage medium of Example 46, the executable computer instructions to cause the computing device to determine the at least one region-sequence based on at least one selection criterion, the at least one selection criterion comprises a coherency selection criterion.

Example 55 is the non-transitory computer-readable storage medium of Example 46, the executable computer instructions to cause the computing device to determine the at least one region-sequence based on at least one selection criterion, the at least one selection criterion comprises a coherency selection criterion configured to maximize a cosine similarity between the plurality of regions of the at least one-region sequence.

Example 56 is the non-transitory computer-readable storage medium of Example 46, the executable computer instructions to cause the computing device to determine the at least one region-sequence based on at least one selection criterion, the at least one selection criterion comprises a coherency selection criterion defined as $f_{coh} = \Sigma_{r_s \in A_{t-1}} (x_{r_t}, x_{r_s})$, where $x_{r_t}$ is a feature vector of a frame t, $x_{r_s}$ is a feature vector of the plurality of regions in a frame t−1.

Example 57 is the non-transitory computer-readable storage medium of Example 46 the executable computer instructions to cause the computing device to determine the at least one region-sequence based on at least one selection criterion, the at least one selection criterion comprises a divergency selection criterion.

Example 58 is the non-transitory computer-readable storage medium of Example 46 the executable computer instructions to cause the computing device to determine the at least one region-sequence based on at least one selection criterion, the at least one selection criterion comprises a divergency selection criterion configured to maximally separate the plurality of regions of the at least one region-sequence in terms of divergence.

Example 59 is the non-transitory computer-readable storage medium of Example 46 the executable computer instructions to cause the computing device to determine the at least one region-sequence based on at least one selection criterion, the at least one selection criterion comprises a divergency selection criterion defined as $$f_{div} = \sum_{i=1}^{N} \int_w p_i^w \log \frac{p_i^w}{q^w} dw,$$

where $q^w$ is a probability distribution of a candidate region of the plurality of regions.

Example 60 is the non-transitory computer-readable storage medium of Example 46, the executable computer instructions to cause the computing device to determine the at least one region-sequence based on at least one selection criterion, the at least one selection criterion comprises at least one of an informativeness selection criterion, a coherency selection criterion, or a divergency selection criterion.

Example 61 is the non-transitory computer-readable storage medium of Example 46, the executable computer instructions to cause the computing device to process the at least one frame via a computational model to generate a response map comprising at least one anchor point representing at least one of the plurality of regions.

Example 62 is the non-transitory computer-readable storage medium of Example 46, the executable computer instructions to cause the computing device to process the at least one frame via a computational model, the computational model comprises a convolutional neural network (CNN).

Example 63 is the non-transitory computer-readable storage medium of Example 46, the executable computer instructions to cause the computing device to process the at least one frame via a computational model comprising a convolutional neural network (CNN), the CNN comprises a lexical-fully convolutional neural network (lexical-FCN).

Example 64 is the non-transitory computer-readable storage medium of Example 46, the executable computer instructions to cause the computing device to process the at least one frame via a computational model comprising a convolutional neural network (CNN) trained with a multi-instance multi-label learning (MIMLL) process.

Example 65 is the non-transitory computer-readable storage medium of Example 46, the executable computer instructions to cause the computing device to process the at least one frame via a computational model comprising a convolutional neural network (CNN) trained with a multi-instance multi-label learning (MIMLL) process to generate a lexical-fully convolutional neural network (lexical-FCN).

Example 66 is the non-transitory computer-readable storage medium of Example 46, the language model comprises a sequence-to-sequence learning framework comprising at least one recurrent neural network (RNN).

Example 67 is the non-transitory computer-readable storage medium of Example 46, the language model comprises a sequence-to-sequence learning framework comprising a plurality of long-short term memory networks (LSTMs).

Example 68 is an apparatus, comprising a receiver means to receive a source video comprising a plurality of frames, and a video description means to determine a plurality of regions for the plurality of frames, generate at least one region-sequence connecting the determined plurality of regions, and apply a language model to the at least one region-sequence to generate description information comprising a description of at least a portion of content of the source video.

Example 69 is the apparatus of Example 68, further comprising a video captioning means to generate a captioned video comprising at least one of the plurality of frames annotated with the description information.

Example 70 is the apparatus of Example 68, further comprising a video captioning means to generate a captioned video comprising at least one of the plurality of frames annotated with the at least one region-sequence and the description information.

Example 71 is the apparatus of Example 68, each of the plurality of regions comprises a region of interest.

Example 72 is the apparatus of Example 68, the description information comprises a natural language description of at least one of the plurality of regions.

Example 73 is the apparatus of Example 68, the video description means is further to determine the at least one region-sequence based on at least one selection criterion, the at least one selection criterion comprises an informativeness selection criterion.

Example 74 is the apparatus of Example 68, the video description means is further to determine the at least one region-sequence based on at least one selection criterion, the at least one selection criterion comprises an informativeness selection criterion configured to maximize information in the at least one region-sequence.

Example 75 is the apparatus of Example 68, the video description means is further to determine the at least one region-sequence based on at least one selection criterion, the at least one selection criterion comprises an informativeness selection criterion defined as $f_{inf}(x_v, A_t) = \Sigma_w p^w$, $p^w = \max_{i \in A_t} p_i^w$, where $x_v$ are feature vectors of the source video, $A_t$ is a current region-sequence subset until frame t.

Example 76 is the apparatus of Example 68, the video description means is further to determine the at least one region-sequence based on at least one selection criterion, the at least one selection criterion comprises a coherency selection criterion.

Example 77 is the apparatus of Example 68, the video description means is further to determine the at least one region-sequence based on at least one selection criterion, the at least one selection criterion comprises a coherency selection criterion configured to maximize a cosine similarity between the plurality of regions of the at least one-region sequence.

Example 78 is the apparatus of Example 68, the video description means is further to determine the at least one region-sequence based on at least one selection criterion, the at least one selection criterion comprises a coherency selection criterion defined as $f_{coh} = \Sigma_{r_s \in A_{t-1}} (x_{r_t}, x_{r_s})$, where $x_{r_t}$ is a feature vector of a frame t, $x_{r_s}$ is a feature vector of the plurality of regions in a frame t−1.

Example 79 is the apparatus of Example 68, the video description means is further to determine the at least one region-sequence based on at least one selection criterion, the at least one selection criterion comprises a divergency selection criterion.

Example 80 is the apparatus of Example 68, the video description means is further to determine the at least one region-sequence based on at least one selection criterion, the at least one selection criterion comprises a divergency selection criterion configured to maximally separate the plurality of regions of the at least one region-sequence in terms of divergence.

Example 81 is the apparatus of Example 68, the video description means is further to determine the at least one region-sequence based on at least one selection criterion, the at least one selection criterion comprises a divergency selection criterion defined as $$f_{div} = \sum_{i=1}^{N} \int_w p_i^w \log \frac{p_i^w}{q^w} dw,$$

where $q^w$ is a probability distribution of a candidate region of the plurality of regions.

Example 82 is the apparatus of Example 68, the video description means is further to determine the at least one region-sequence based on at least one selection criterion, the at least one selection criterion comprises at least one of an informativeness selection criterion, a coherency selection criterion, or a divergency selection criterion.

Example 83 is the apparatus of Example 68, the video description means is further to process the at least one frame via a computational model to generate a response map comprising at least one anchor point representing at least one of the plurality of regions.

Example 84 is the apparatus of Example 68, further comprising a computational model means to process the at least one frame via a computational model, the computational model comprises a convolutional neural network (CNN).

Example 85 is the apparatus of Example 68, further comprising a computational model means to process the at least one frame via a computational model comprising a convolutional neural network (CNN), the CNN comprises a lexical-fully convolutional neural network (lexical-FCN).

Example 86 is the apparatus of Example 68, further comprising a computational model means to process the at least one frame via a computational model comprising a convolutional neural network (CNN) trained with a multi-instance multi-label learning (MIMLL) process.

Example 87 is the apparatus of Example 68, further comprising a computational model means to process the at least one frame via a computational model comprising a convolutional neural network (CNN) trained with a multi-instance multi-label learning (MIMLL) process to generate a lexical-fully convolutional neural network (lexical-FCN).

Example 88 is the apparatus of Example 68, the language model comprises a sequence-to-sequence learning framework comprising at least one recurrent neural network (RNN).

Example 89 is the apparatus of Example 68, the language model comprises a sequence-to-sequence learning framework comprising a plurality of long-short term memory networks (LSTMs).

Example 90 is a system, comprising the apparatus according to any of Examples 68-89, and at least one transceiver.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
   at least one memory; and
   logic, at least a portion of the logic comprised in hardware coupled to the at least one memory, the logic to:
   receive a source video comprising a plurality of frames,
   determine a plurality of regions for the plurality of frames,
   generate at least one region-sequence connecting the determined plurality of regions based on at least one selection criterion, the at least one selection criterion comprises an informativeness selection criterion, a coherency selection criterion or a divergence selection criterion, and
   apply a language model to the at least one region-sequence to generate description information comprising a description of at least a portion of content of the source video.

2. The apparatus of claim 1, the logic to generate a captioned video comprises at least one of the plurality of frames annotated with the at least one region-sequence and the description information.

3. The apparatus of claim 1, the description information comprises a natural language description of at least one of the plurality of regions.

4. The apparatus of claim 1, the logic is further to determine the at least one region-sequence based on at least one selection criterion, the at least one selection criterion comprises the informativeness selection criterion configured to maximize information in the at least one region-sequence.

5. The apparatus of claim 1, the logic is further to determine the at least one region-sequence based on at least one selection criterion, the at least one selection criterion comprises the coherency selection criterion configured to maximize a cosine similarity between the plurality of regions of the at least one-region sequence.

6. The apparatus of claim 1 the logic is further to determine the at least one region-sequence based on at least one selection criterion, the at least one selection criterion comprises the divergency selection criterion configured to maximally separate the plurality of regions of the at least one region-sequence in terms of divergence.

7. The apparatus of claim 1, the language model comprises a sequence-to-sequence learning framework comprising a plurality of long-short term memory networks (LSTMs).

8. An apparatus, comprising:
   at least one memory; and
   logic, at least a portion of the logic comprised in hardware coupled to the at least one memory, the logic to:
   receive a source video comprising a plurality of frames,
   determine a plurality of regions for the plurality of frames,
   generate at least one region-sequence connecting the determined plurality of regions, and
   apply a language model to the at least one region-sequence to generate description information comprising a description of at least a portion of content of the source video,
   the logic is further to process at least one frame via a computational model to generate a response map comprising at least one anchor point representing at least one region of the plurality of regions.

9. An apparatus, comprising:
   at least one memory; and
   logic, at least a portion of the logic comprised in hardware coupled to the at least one memory, the logic to:
   receive a source video comprising a plurality of frames,
   determine a plurality of regions for the plurality of frames,
   generate at least one region-sequence connecting the determined plurality of regions, and apply a language model to the at least one region-sequence to generate description information comprising a description of at least a portion of content of the source video, the logic is further to process at least one frame via a computational model comprising a convolutional neural network (CNN), the CNN comprises a lexical-fully convolutional neural network (lexical-FCN), in order to determine at least one of the plurality of regions.

10. An apparatus, comprising:
at least one memory; and
logic, at least a portion of the logic comprised in hardware coupled to the at least one memory, the logic to:
receive a source video comprising a plurality of frames,
determine a plurality of regions for the plurality of frames,
generate at least one region-sequence connecting the determined plurality of regions, and
apply a language model to the at least one region-sequence to generate description information comprising a description of at least a portion of content of the source video,
the logic is further to process at least one frame via a computational model comprising a convolutional neural network (CNN) trained with a multi-instance multi-label learning (MIMLL) process in order to determine at least one of the plurality of regions.

11. An apparatus, comprising:
at least one memory; and
logic, at least a portion of the logic comprised in hardware coupled to the at least one memory, the logic to:
receive a source video comprising a plurality of frames,
determine a plurality of regions for the plurality of frames,
generate at least one region-sequence connecting the determined plurality of regions, and
apply a language model to the at least one region-sequence to generate description information comprising a description of at least a portion of content of the source video,
the logic is further to process at least one frame via a computational model comprising a convolutional neural network (CNN) trained with a multi-instance multi-label learning (MIMLL) process to generate a lexical-fully convolutional neural network (lexical-FCN) in order to determine at least one of the plurality of regions.

12. A method, comprising:
receiving a source video comprising a plurality of frames;
determining a plurality of regions for each of the plurality of frames;
generating at least one region-sequence connecting the determined plurality of regions based on at least one selection criterion, the at least one selection criterion comprises an informativeness selection criterion, a coherency selection criterion or a divergence selection criterion; and
applying a language model to the at least one region-sequence to generate description information comprising a description of at least a portion of content of the source video.

13. The method of claim 12, further comprising generating a captioned video comprising at least one of the plurality of frames annotated with the at least one region-sequence and the description information.

14. The method of claim 12, wherein determining the at least one region-sequence comprises determining the at least one region-sequence based on at least one selection criterion, the at least one selection criterion comprises the informativeness selection criterion configured to maximize information in the at least one region-sequence.

15. The method of claim 12, wherein determining the at least one region-sequence comprises determining the at least one region-sequence based on at least one selection criterion, the at least one selection criterion comprises the coherency selection criterion configured to maximize a cosine similarity between the plurality of regions of the at least one-region sequence.

16. The method of claim 12, wherein determining the at least one region-sequence comprises determining the at least one region-sequence based on at least one selection criterion, the at least one selection criterion comprises the divergency selection criterion configured to maximally separate the plurality of regions of the at least one region-sequence in terms of divergence.

17. A method, comprising:
receiving a source video comprising a plurality of frames;
determining a plurality of regions for each of the plurality of frames;
generating at least one region-sequence connecting the determined plurality of regions; and
applying a language model to the at least one region-sequence to generate description information comprising a description of at least a portion of content of the source video;
wherein determining at least one of the plurality of regions comprises processing at least one frame via a computational model comprising a convolutional neural network (CNN), the CNN comprises a lexical-fully convolutional neural network (lexical-FCN).

18. A method, comprising:
receiving a source video comprising a plurality of frames;
determining a plurality of regions for each of the plurality of frames;
generating at least one region-sequence connecting the determined plurality of regions; and
applying a language model to the at least one region-sequence to generate description information comprising a description of at least a portion of content of the source video;
wherein determining at least one of the plurality of regions comprises processing at least one frame via a computational model comprising a convolutional neural network (CNN) trained with a multi-instance multi-label learning (MIMLL) process to generate a lexical-fully convolutional neural network (lexical-FCN).

19. A non-transitory computer-readable storage medium that stores executable computer instructions for execution by processing circuitry of a computing device, the instructions to cause the computing device to:
receive a source video comprising a plurality of frames;
determine a plurality of regions for each of the plurality of frames;
generate at least one region-sequence connecting the plurality of regions based on at least one selection criterion, the at least one selection criterion comprises an informativeness selection criterion, a coherency selection criterion or a divergence selection criterion; and
apply a language model to the at least one region-sequence to generate description information comprising a description of at least a portion of content of the source video.

20. The non-transitory computer-readable storage medium of claim 19, the executable computer instructions to cause the computing device to generate a captioned video comprising at least one of the plurality of frames annotated with the at least one region-sequence and the description information.

21. The non-transitory computer-readable storage medium of claim 19, the executable computer instructions to cause the computing device to determine the at least one region-sequence based on at least one selection criterion, the at least one selection criterion comprises the informativeness selection criterion configured to maximize information in the at least one region-sequence.

22. The non-transitory computer-readable storage medium of claim 19, the executable computer instructions to cause the computing device to determine the at least one region-sequence based on at least one selection criterion, the at least one selection criterion comprises the coherency selection criterion configured to maximize a cosine similarity between the plurality of regions of the at least one-region sequence.

23. The non-transitory computer-readable storage medium of claim 19, the executable computer instructions to cause the computing device to determine the at least one region-sequence based on at least one selection criterion, the at least one selection criterion comprises the divergency selection criterion configured to maximally separate the plurality of regions of the at least one region-sequence in terms of divergence.

24. A non-transitory computer-readable storage medium that stores executable computer instructions for execution by processing circuitry of a computing device, the instructions to cause the computing device to:
    receive a source video comprising a plurality of frames;
    determine a plurality of regions for each of the plurality of frames;
    generate at least one region-sequence connecting the plurality of regions; and
    apply a language model to the at least one region-sequence to generate description information comprising a description of at least a portion of content of the source video;
    wherein determining at least one of the plurality of regions comprises process at least one frame via a computational model comprising a convolutional neural network (CNN) trained with a multi-instance multi-label learning (MIMLL) process to generate a lexically fully convolutional neural network (lexical-FCN).

* * * * *